(12) United States Patent
Jiao et al.

(10) Patent No.: US 8,842,597 B2
(45) Date of Patent: Sep. 23, 2014

(54) METHOD, APPARATUS AND SYSTEM FOR DATA TRANSMISSION

(75) Inventors: Bin Jiao, Beijing (CN); Wei Bao, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 0 days.

(21) Appl. No.: 13/980,053

(22) PCT Filed: Jan. 11, 2012

(86) PCT No.: PCT/CN2012/070239
§ 371 (c)(1),
(2), (4) Date: Jul. 17, 2013

(87) PCT Pub. No.: WO2012/097699
PCT Pub. Date: Jul. 26, 2012

(65) Prior Publication Data
US 2013/0294326 A1    Nov. 7, 2013

(30) Foreign Application Priority Data
Jan. 17, 2011 (CN) .......................... 2011 1 0009870

(51) Int. Cl.
| | | |
|---|---|---|
| H04H 20/71 | (2008.01) |
| H04W 72/00 | (2009.01) |
| H04W 76/02 | (2009.01) |
| H04W 4/00 | (2009.01) |
| H04L 12/28 | (2006.01) |
| H04L 12/56 | (2006.01) |

(52) U.S. Cl.
CPC ................................. H04W 72/005 (2013.01);
H04W 76/022 (2013.01)
USPC ............ 370/312; 370/328; 370/338; 370/401

(58) Field of Classification Search
CPC . H04W 72/005; H04W 76/022; H04W 16/26; H04B 7/2606
USPC .................................. 370/312, 328, 338, 401
See application file for complete search history.

(56) References Cited

U.S. PATENT DOCUMENTS

| | | | |
|---|---|---|---|
| 2010/0027541 A1* | 2/2010 | Eriksson et al. .............. 370/390 |
| 2010/0034135 A1 | 2/2010 | Kim et al. | |

(Continued)

FOREIGN PATENT DOCUMENTS

| | | |
|---|---|---|
| CN | 101515856 A | 8/2009 |
| CN | 1020083006 A | 6/2011 |

OTHER PUBLICATIONS

International Search Report for PCT/CN2012/070239.

*Primary Examiner* — Xavier Szewai Wong
(74) *Attorney, Agent, or Firm* — Kilpatrick Townsend & Stockton LLP

(57) ABSTRACT

Disclosed in the present application are a method, an apparatus and a system for data transmission, which are used to realize support for transmission of MBMS service in a network scene with deployment of RNs. A data transmission method disclosed in the present invention comprises the following steps: a Relay Node RN establishes a first corresponding relationship between indications of Multimedia Broadcast Multicast Service MBMS bearers and indications of user plane data tunnels of MBMS sessions, and a second corresponding relationship between the indications of user plane data tunnels of MBMS sessions and indications of MBMS sessions; the RN obtains, according to the first corresponding relationship, the user plane data of a MBMS session transmitted from a Donor Evolved Node DeNB, and transmits, according to the second corresponding relationship, the user plane data of the MBMS session to a User Equipment UE.

15 Claims, 9 Drawing Sheets

(56) References Cited

U.S. PATENT DOCUMENTS

| | | | |
|---|---|---|---|
| 2010/0103863 A1* | 4/2010 | Ulupinar et al. | 370/315 |
| 2010/0150049 A1* | 6/2010 | Kim et al. | 370/312 |
| 2010/0254295 A1* | 10/2010 | Ahn et al. | 370/312 |
| 2011/0085489 A1* | 4/2011 | Rydnell et al. | 370/312 |
| 2011/0149831 A1* | 6/2011 | Hyun et al. | 370/312 |
| 2011/0242970 A1* | 10/2011 | Prakash et al. | 370/225 |

* cited by examiner

METHOD, APPARATUS AND SYSTEM FOR DATA TRANSMISSION

The present application is a US National Stage of International Application No. PCT/CN2012/070239, filed 11 Jan. 2012, designating the United States, and claiming priority to Chinese Patent Application No. 201110009870.1, filed with the State Intellectual Property Office of China on Jan. 17, 2011 and entitled "Method, apparatus and system for data transmission", which is hereby incorporated by reference in its entirety.

FIELD OF THE INVENTION

The present invention relates to the field of communications and particularly to a data transmission method, apparatus and system.

BACKGROUND OF THE INVENTION

A Relay Node (simply referred below to as an RN) is introduced to a Long Term Evolution-Advanced (LTE-A) system so as to extend network coverage. The RN is connected wirelessly with a Donor evolved NodeB (DeNB). A wireless interface between them is referred to as a Uu interface. The RN does not support a Multimedia Broadcast Multicast Service (MBMS) due to the architecture of the system in the prior art.

A detailed description related to an RN in the prior art will be given below.

In a future mobile communication system, e.g., in a Beyond Third Generation (B3G) system or in an LTE-A system, the system will provide higher peak data rates and a higher cell throughput and also require a higher bandwidth, and since there is few unallocated bandwidth below 2 GHz at present, a part or all of the bandwidth required for the B3G system has to be located in a higher frequency band, for example, the bandwidth required for the B3G system has to be sought in a frequency band above 3 GHz. A propagating electric wave will be attenuated faster and transmitted over a shorter distance in a higher frequency band, so a larger number of eNBs will be needed in the same coverage area so as to ensure continuous coverage, and this will undoubtedly increase the cost of network deployment because the eNBs are generally relatively expensive. In order to address the issues of network deployment cost and coverage, various manufacturers and standardization organizations come to research the introduction of an RN to a cellular system so as to extend the coverage area.

In the network of the LTE-A system with an RN introduced thereto, the RN accesses a core network over a donor cell served by a DeNB and has no direct wired interface with the core network, and each RN can control one or more cells. In this architecture, there is an interface referred to as a Uu interface between a User Equipment (UE) and the RN, and there is an interface referred to as a Un interface between the RN and the DeNB.

In the architecture of the LTE-A system with the RN introduced thereto, the RN has the following dual identity.

Firstly, the RN has the identity of a UE, and the RN is started up similarly to a power-on attachment procedure of a UE. The RN has to be connected to a Serving Gateway (SGW) or a Packet Data Network (PDN) Gateway (PGW), and a control node which is a Mobility Management Entity (MME).

Secondly, the RN has the identity of an eNB for a UE accessing the RN, and in this case, downlink data of the UE has to be transmitted from the SGW or the PGW to a serving eNB of the UE, i.e., the RN, and then transmitted from the RN to the UE via the Uu interface.

In a process of establishing an Evolved Packet System (EPS) unicast bearer in the scenario with a deployed RN, a PGW to which the UE is connected triggers the EPS dedicated bearer of the UE to be established. The EPS unicast bearer specific to the UE will be mapped onto an air interface unicast Radio Bearer (RB) between the RN and the DeNB via the Un interface. The DeNB can map the EPS unicast bearer onto an established Un interface unicast RB (if the DeNB maps the EPS unicast bearer onto an established Un interface unicast RB, then the DeNB will trigger a procedure of updating the RB so as to allocate more transmission resources for the RB) or reestablish a new Un interface unicast RB for the EPS unicast bearer.

In the prior art, each EPS bearer includes a Quality of Service (QoS) parameter attribute, and the DeNB maps EPS bearers with similar QoS requirements onto the same RB via the Un interface for transmission under a mapping rule preconfigured on the DeNB.

An MBMS system architecture and a process of establishing an MBMS bearer will be introduced below.

In the MBMS system architecture, an M1 interface is a pure user plane interface defined between an eNB and a Multimedia Broadcast Multicast Service (MBMS) Gateway (GW), and the M1 interface provides non-guaranteed transmission of user plane data between the MBMS GW and the eNB. An M2 interface is a control plane interface defined between the eNB and a Multi-Cell/Multicast Coordination Entity (MCE), and the M2 interface is generally configured to manage an MBMS session and to supply MBMS scheduling information. An M3 interface is a control plane interface defined between an MME and the MCE, and the M3 interface is generally configured to manage an MBMS session.

As specified in the 3GPP TS 23.246, a Broadcast-Multicast Service Centre (BM-SC) triggers an MBMS session initiation flow in which the MBMS GW, the MME and the eNB are involved. An Evolved Universal Terrestrial Radio Access Network (E-UTRAN) is responsible for reserving a resource at an air interface for transmission of MBMS bearer data. The eNB obtains MBMS user plane data from the MBMS GW by joining an IP multicast group.

In summary, a normal eNB in the prior art can control all or a part of cells served by the eNB according to scheduling information of the MCE to participate in transmission of an MBMS. Given a scenario with hybrid deployment of an RN and the normal eNB, however, the RN does not support transmission of the MBMS on one hand, and a general deployment scenario of the RN relates to extension of coverage (a UE can only receive signals from the RN in the extended coverage) on the other hand, so a UE may fail to receive the MBMS normally once the UE moves to a coverage area of the RN, thus seriously influencing the experience of a user.

SUMMARY OF THE INVENTION

Embodiments of the invention provide a data transmission method, apparatus and system so as to support transmission of an MBMS in a network scenario with a deployed RN.

In order to address such a problem in the prior art that an RN does not support transmission of MBMS service data in a network system deployed with the RN, an embodiment of the invention provides a data transmission method including:

establishing, by an RN, a first correspondence relationship between a Multimedia Broadcast Multicast Service (MBMS) bearer identifier and a user plane data tunnel identifier of an MBMS session and a second correspondence relationship between the user plane data tunnel identifier of the MBMS session and an MBMS session identifier; and obtaining, by the RN, user plane data of the MBMS session transmitted from a Donor eNB (DeNB) according to the first correspondence relationship and transmitting the user plane data of the MBMS session to a User Equipment (UE) according to the second correspondence relationship.

In order to address such a problem in the prior art that a DeNB does not support transmission of MBMS service data in a network system deployed with an RN, an embodiment of the invention provides a data transmission method including:

determining, by a Donor eNB (DeNB), a Multimedia Broadcast Multicast Service (MBMS) bearer of a Un interface;

obtaining, by the DeNB, user plane data of an MBMS session transmitted from a user plane device of a core network after the MBMS session is established; and transmitting, by the DeNB, the user plane data of the MBMS session to a Relay Node (RN) over the MBMS bearer.

In order to address such a problem in the prior art that an MCE does not support transmission of MBMS service data in a network system deployed with an RN, an embodiment of the invention provides a data transmission method including:

triggering, by a Multi-Cell/Multicast Coordination Entity (MCE), a Donor eNB (DeNB) in a Multimedia Broadcast Multicast Service (MBMS) Session Start Request message to establish an MBMS bearer for an MBMS session, and wherein the MBMS Session Start Request message includes a Quality of Service (QoS) parameter of the MBMS session.

In order to address such a problem in the prior art that an MCE and a DeNB do not support transmission of MBMS service data in a network system deployed with an RN, an embodiment of the invention provides a data transmission method including:

triggering, by a Multi-Cell/Multicast Coordination Entity (MCE), a Donor eNB (DeNB) in a Multimedia Broadcast Multicast Service (MBMS) Session Start Request message to establish an MBMS bearer for an MBMS session; and determining, by the DeNB, a Multimedia Broadcast Multicast Service (MBMS) bearer of a Un interface in response to the trigger of the MCE; and obtaining and forwarding over the MBMS bearer to a Relay Node (RN) user plane data of the MBMS session transmitted from a user plane device of a core network after the MBMS session is established.

In order to address such a problem in the prior art that an RN does not support transmission of MBMS service data in a network system deployed with the RN, an embodiment of the invention provides a data transmission apparatus including:

a correspondence relationship establishment unit configured to establish a first correspondence relationship between a Multimedia Broadcast Multicast Service (MBMS) bearer identifier and a user plane data tunnel identifier of an MBMS session and a second correspondence relationship between the user plane data tunnel identifier of the MBMS session and an MBMS session identifier; and a transmission process unit configured to obtain user plane data of the MBMS session transmitted from a Donor eNB (DeNB) according to the first correspondence relationship and to transmit the user plane data of the MBMS session to a User Equipment (UE) according to the second correspondence relationship.

In order to address such a problem in the prior art that a DeNB does not support transmission of MBMS service data in a network system deployed with an RN, an embodiment of the invention provides a data transmission apparatus including:

an MBMS bearer determination unit configured to determine a Multimedia Broadcast Multicast Service (MBMS) bearer of a Un interface; and a transmission process unit configured to obtain user plane data of an MBMS session transmitted from a user plane device of a core network after the MBMS session is established; and to transmit the user plane data of the MBMS session to a Relay Node (RN) over the MBMS bearer.

In order to address such a problem in the prior art that an MCE and a DeNB do not support transmission of MBMS service data in a network system deployed with an RN, an embodiment of the invention provides a data transmission apparatus including:

a message determination unit configured to determine a Multimedia Broadcast Multicast Service (MBMS) Session Start Request message; and a trigger unit configured to trigger a Donor eNB (DeNB) in the MBMS Session Start Request message to establish an MBMS bearer for an MBMS session, and wherein the MBMS Session Start Request message includes a Quality of Service (QoS) parameter of the MBMS session.

In order to address such a problem in the prior art that an RN does not support transmission of MBMS service data in a network system deployed with the RN, an embodiment of the invention provides a data transmission system including:

a Multi-Cell/Multicast Coordination Entity (MCE) configured to trigger a Donor eNB (DeNB) in a Multimedia Broadcast Multicast Service (MBMS) Session Start Request message to establish an MBMS bearer for an MBMS session; and the DeNB configured to determine a Multimedia Broadcast Multicast Service (MBMS) bearer of a Un interface in response to the trigger of the MCE; and to obtain and forward over the MBMS bearer to a Relay Node (RN) user plane data of the MBMS session transmitted from a user plane device of a core network after the MBMS session is established.

In the embodiments of the invention, an RN establishes a first correspondence relationship between an MBMS bearer identifier and a user plane data tunnel identifier of an MBMS session and a second correspondence relationship between the user plane data tunnel identifier of the MBMS session and an MBMS session identifier, and the RN obtains user plane data of the MBMS session transmitted from a DeNB according to the first correspondence relationship and transmits the user plane data of the MBMS session to a UE according to the second correspondence relationship, thereby transmitting an MBMS in the network scenario with the deployed RN so that the UE can receive the MBMS normally in a coverage area of the RN.

DETAILED DESCRIPTION OF THE EMBODIMENTS

Embodiments of the invention provide a method, apparatus and system for establishing an MBMS bearer so as to support transmission of an MBMS in a network scenario with a deployed RN.

In order to ensure a UE to receive an MBMS normally and continually in a scenario with a deployed RN, embodiments of the invention provide an enhanced solution to an RN startup process and an RN disabling process so that a system continues its support of transmission of an MBMS in the scenario with a deployed RN.

An RN parses a header of user plane data of an MBMS session transmitted from a DeNB to obtain a user plane data tunnel identifier of the MBMS session, and searches for a correspondence relationship between an MBMS bearer identifier and the user plane data tunnel identifier of the MBMS session to determine the MBMS bearer identifier corresponding to the user plane data tunnel identifier of the MBMS session, and obtains user plane data of the MBMS session transmitted from the DeNB over an MBMS bearer corresponding to the MBMS bearer identifier; and then the RN determines the user plane data of the MBMS session to be transmitted to a UE according to an MBMS session identifier; and the RN searches for a correspondence relationship between the user plane data tunnel identifier of the MBMS session and the MBMS session identifier to determine the user plane data tunnel identifier of the MBMS session corresponding to the MBMS session identifier, and determines a physical resource serving the MBMS session according to the user plane data tunnel identifier of the MBMS session to thereby transmit the user plane data of the MBMS session to the UE over the physical resource.

The technical solutions according to the embodiments of the invention will be described below with reference to the drawings.

Figure 1:
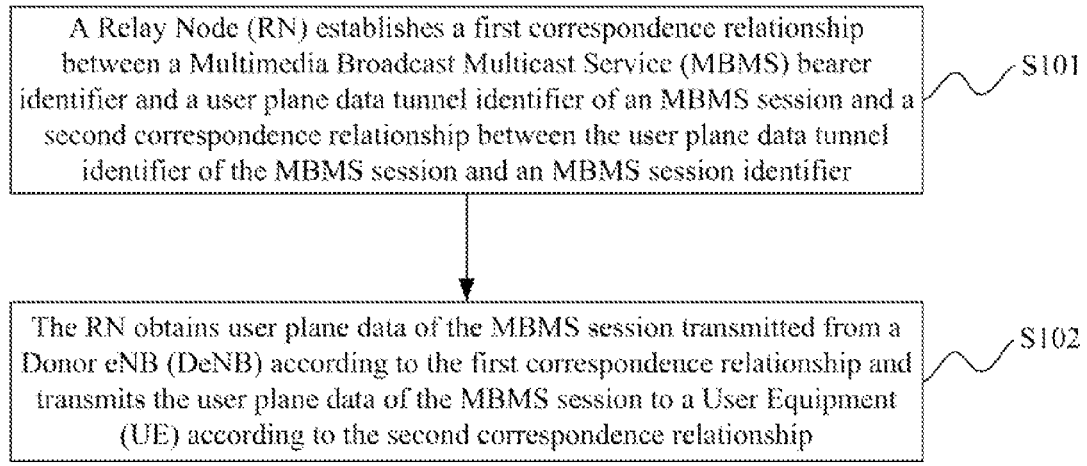
FIG. 1 is a schematic flow chart of a data transmission method according to an embodiment of the invention.

Referring to FIG. 1, an embodiment of the invention provides a data transmission method at the RN side, where this method includes the following steps.

S101. A Relay Node (RN) establishes a first correspondence relationship between an MBMS bearer identifier and a user plane data tunnel identifier of an MBMS session and a second correspondence relationship between the user plane data tunnel identifier of the MBMS session and an MBMS session identifier.

S102. The RN obtains user plane data of the MBMS session transmitted from a Donor eNB (DeNB) according to the first correspondence relationship and transmits the user plane data of the MBMS session to a User Equipment (UE) according to the second correspondence relationship.

Preferably, the RN establishes the first correspondence relationship includes:

The RN receives an MBMS Session Start Request message sent from the DeNB and obtains therefrom the user plane data tunnel identifier of the MBMS session; and In a process of establishing or updating an MBMS bearer of a Un interface triggered by the DeNB, the RN obtains the MBMS bearer identifier and establishes the first correspondence relationship between the MBMS bearer identifier and the user plane data tunnel identifier of the MBMS session.

Preferably, the RN establishes the second correspondence relationship includes:

The RN receives an MBMS Session Start Request message sent from the DeNB and obtains therefrom the user plane data tunnel identifier of the MBMS session and the MBMS session identifier; and The RN establishes the second correspondence relationship between the user plane data tunnel identifier of the MBMS session and the MBMS session identifier.

Preferably, the RN obtains the user plane data of the MBMS session transmitted from the Donor eNB (DeNB) according to the first correspondence relationship includes:

The RN parses a header of the user plane data of the MBMS session transmitted from the DeNB to obtain the user plane data tunnel identifier of the MBMS session, searches for the first correspondence relationship to determine the MBMS bearer identifier corresponding to the user plane data tunnel identifier of the MBMS session, and obtains the user plane data of the MBMS session transmitted from the DeNB over an MBMS bearer corresponding to the MBMS bearer identifier.

Preferably, the RN transmits the user plane data of the MBMS session to the User Equipment (UE) according to the second correspondence relationship includes:

The RN determines the user plane data of the MBMS session to be transmitted to the UE according to the MBMS session identifier; and the RN searches for the second correspondence relationship to determine the user plane data tunnel identifier of the MBMS session corresponding to the MBMS session identifier, determines a physical resource serving the MBMS session according to the user plane data tunnel identifier of the MBMS session and transmits the user plane data of the MBMS session to the UE over the physical resource.

Correspondingly, an embodiment of the invention provides a data transmission method at the DeNB side, where this method includes:

A Donor eNB (DeNB) determines a Multimedia Broadcast Multicast Service (MBMS) bearer of a Un interface;

The DeNB obtains user plane data of an MBMS session transmitted from a user plane device of a core network after the MBMS session is established; and The DeNB transmits the user plane data of the MBMS session to a Relay Node (RN) over the MBMS bearer.

Preferably, the DeNB determines the MBMS bearer of the Un interface includes:

The DeNB determines configuration parameter information of the MBMS bearer of the Un interface according to a Quality of Service (QoS) parameter of the MBMS session carried in an MBMS Session Start Request message sent from a Multi-Cell/Multicast Coordination Entity (MCE); and The DeNB sends the MBMS Session Start Request message to the RN and triggers a process of establishing or updating the MBMS bearer of the Un interface according to the configuration parameter information of the MBMS bearer of the Un interface upon reception of an MBMS Session Start Response message fed back from the RN.

Preferably, the MBMS bearer is a Radio Bearer (RB) or an MBMS point to multipoint Radio Bearer (MRB).

Preferably, when the MBMS bearer is an MRB, the configuration parameter information of the MBMS bearer of the Un interface includes:

An identifier of the MRB, a Tunnel Endpoint Identifier (TEID), a multimedia broadcast multicast service single-frequency network sub-frame configuration, a modulation and coding scheme, a logical channel identifier for the MRB, and an MBMS session identifier associated with the MRB.

Preferably, the DeNB triggers a process of establishing or updating the MBMS bearer of the Un interface according to the configuration parameter information of the MBMS bearer of the Un interface includes:

The DeNB sends the configuration parameter information of the MBMS bearer of the Un interface to the RN in one of the following schemes:

In a first scheme, it is sent in Radio Resource Control (RRC) dedicated signalling;

In a second scheme, it is sent in a Radio Resource Control (RRC) broadcast message;

In a third scheme, it is sent in Multicast Control Channel (MCCH) dedicated control signalling;

In a fourth scheme, it is sent in an application layer protocol signalling for an S1 interface between the DeNB and the RN;

In a fifth scheme, it is sent in an application layer protocol signalling for an X2 interface between the DeNB and the RN; and In a sixth scheme, it is sent in an application layer protocol signalling for an M2 interface between the DeNB and the RN.

Preferably, the DeNB triggers a process of establishing or updating the MBMS bearer of the Un interface according to the configuration parameter information of the MBMS bearer of the Un interface further includes:

The DeNB functions as an MBMS Gateway (MBMS GW) to trigger a Mobility Management Entity (MME) to establish an MBMS session context corresponding to the MRB at the core network side.

Preferably, the method further includes:

The DeNB releases an MBMS bearer resource upon determining termination of the MBMS session.

Preferably, the DeNB determines termination of the MBMS session includes:

The DeNB determines termination of the MBMS session when a timer expires or upon reception of an MBMS Session Stop Request message sent from the MCE.

Particularly, the timer is started when the DeNB transmits the user plane data of the MBMS session to the RN; and the timer has a counting duration determined according to a Session Duration attribute of the MBMS session.

Correspondingly, an embodiment of the invention provides a data transmission method at the MCE side, where this method includes:

A Multi-Cell/Multicast Coordination Entity (MCE) triggers a Donor eNB (DeNB) in a Multimedia Broadcast Multicast Service (MBMS) Session Start Request message to determine an MBMS bearer for an MBMS session.

Particularly, the MBMS Session Start Request message includes a Quality of Service (QoS) parameter of the MBMS session.

Particular embodiments of the invention will be described below.

Particularly, a first embodiment and a second embodiment of the invention are generally intended to address how to map an MBMS bearer corresponding to an MBMS session onto a unicast Radio Bearer (RB) of an RN for the different RN via a Un interface.

In the first embodiment, the DeNB triggers a new RB to be established for a different RN via a Un interface for each MBMS bearer establishment request.

In the second embodiment, the DeNB predefines a list of correspondence relationships between QoS attributes of MBMS bearers and RBs. For each MBMS bearer establishment request, the DeNB searches with a QoS attribute of the MBMS bearer the list of correspondence relationships for the same or similar QoS attribute of an MBMS bearer as or to the QoS attribute, takes an RB corresponding to the found QoS attribute of an MBMS bearer as an RB of the RN and triggers an update process for the RB.

Furthermore, in view of a waste of a radio resource of a Un interface arising from unicast RB transmission respectively for each RN when a large number of RNs are served by the DeNB, a third embodiment and a fourth embodiment of the invention generally address how to map an MBMS bearer corresponding to an MBMS session onto a multicast bearer MRB of a Un interface for all of RNs via the Un interface.

In the third embodiment, the DeNB triggers a new MRB to be established for all of RNs via a Un interface for each MBMS bearer establishment request.

In the fourth embodiment, the DeNB predefines a list of correspondence relationships between QoS attributes of MBMS bearers and MRBs. For each MBMS bearer establishment request, the DeNB searches with a QoS attribute of the MBMS bearer the list of correspondence relationships for the same or similar QoS attribute of an MBMS bearer as or to the QoS attribute, takes an MRB corresponding to the found QoS attribute of an MBMS bearer as an MRB of the RN and triggers an update process for the MRB.

Furthermore, a fifth embodiment and a sixth embodiment of the invention are generally intended to address the problem of releasing a radio resource of a Un interface for an MBMS bearer corresponding to an MBMS session.

The fifth embodiment relates to an RB release solution corresponding to the first embodiment and the second embodiment, and the sixth embodiment relates to an MRB release solution corresponding to the third embodiment and the fourth embodiment. Particularly, the DeNB takes expiration of a timer or reception of a Session Stop message as a condition to decide on triggering release of a radio bearer resource of a Un interface occupied for an MBMS session.

The embodiments will be described respectively below in details.

First Embodiment

Figure 2:
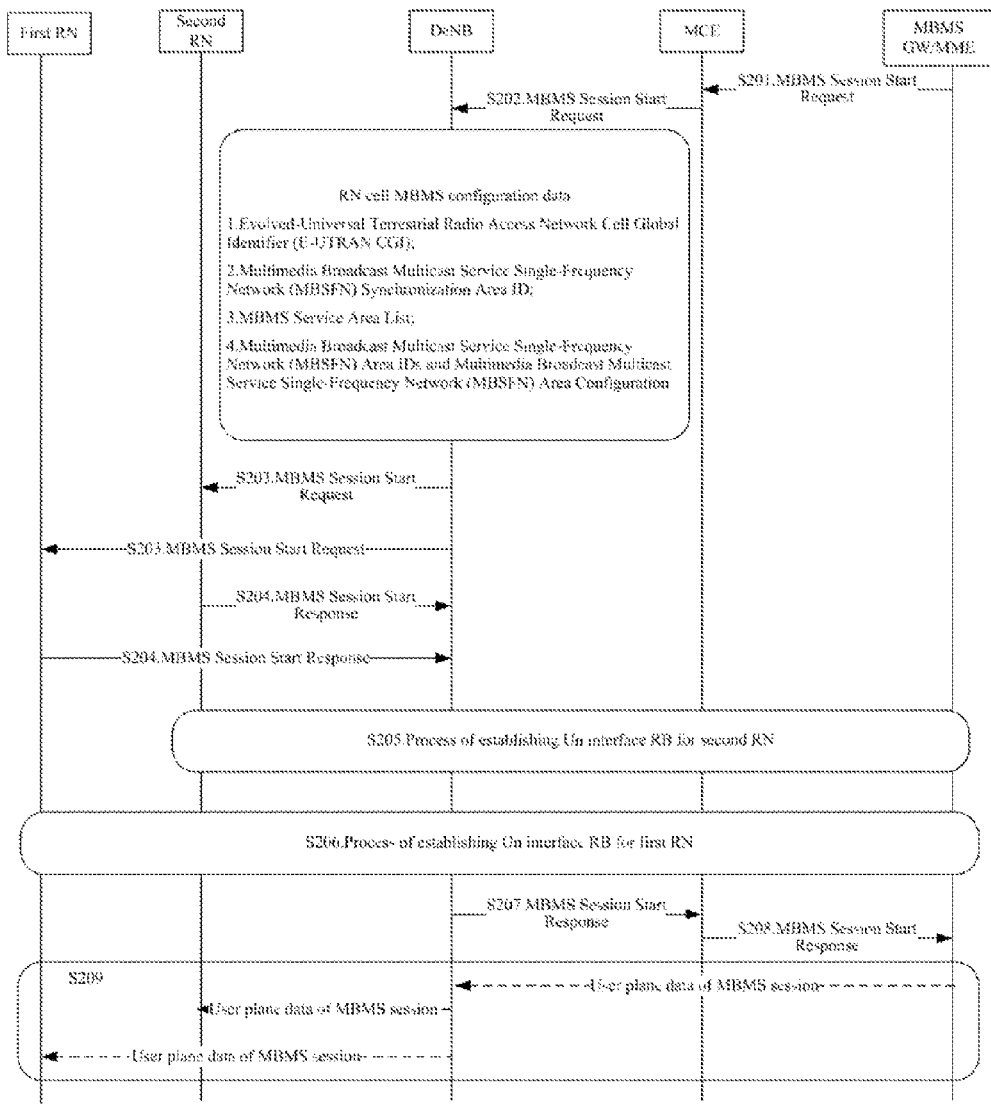
FIG. 2 is a schematic diagram of a process of establishing an MBMS bearer (establishing an RB respectively for a different RN) according to an embodiment of the invention.

The DeNB establishes a different RB respectively via a Un interface for a different destination RN upon reception of each MBMS bearer establishment request. As illustrated in FIG. 2, this process particularly includes the following steps.

Step S201: A core network device (including a user plane node MBMS GW and a control plane node MME) triggers an MCE in an MBMS Session Start Request message to establish an MBMS bearer for an MBMS session, where the MBMS Session Start Request message includes Session ID, Session QoS Parameter, Session Duration, MBMS Service Area information, etc.

Step S202: The MCE triggers a DeNB in an MBMS Session Start Request message to establish an MBMS bearer for the MBMS session, where the MBMS Session Start Request message includes Session ID, Session QoS Parameter, Session Duration, MBMS Service Area information, and a GPRS Tunnel Protocol (GTP) Tunnel Endpoint Identifier (TEID) for the MBMS session, etc.

Particularly, the GTP TEID for the MBMS session is used for an RN to subsequently determine the MBMS session to which user plane data belongs according to a tunnel identifier of the user plane data, i.e., the TEID, in the step S209, that is, to match the MBMS session with the user plane data corresponding to the MBMS session.

In a startup process of the RN, an RN cell reports configuration parameters obtained from an Operation and Management (OAM) scheme, including an RN cell ID, an MBSFN synchronization area ID and an MBMS service area ID, to the DeNB via an M2 interface between the RN and the DeNB. The DeNB stores these parameters locally, and the DeNB functions as a proxy of the RN to send the information of the RN cell to the MCE, the MCE sends configuration information of an MBMS Single-Frequency Network (MBSFN) area related to the RN cell to the DeNB, and the DeNB stores the configuration information of the MBSFN area of the RN Cell locally.

The DeNB determines a list of destination RNs (assumed a first RN and a second RN belong to the list of destination RNs) according to the identifier of an MBMS service area to which the RN cell belongs to and the MBMS service area identifier carried in the MBMS Session Start Request message.

Particularly, in the embodiment of the invention, each RN can manage a plurality of RN cells concurrently, and each DeNB can serve a plurality of RNs. The DeNB stores therein correspondence relationships between lists of RN cells and RNs, so the DeN B firstly determines a list of RN cells involved in the MBMS session and then determines the list of destination RNs according to the correspondence relationships between lists of RN cells and RNs and forwards corresponding signalling to RNs in the list of destination RNs.

On the other hand, the DeNB determines a configuration parameter of an RB required for triggering a Un interface to establish the RB, using a preset mapping table of session QoS parameters of MBMS sessions to configuration parameters of RBs according to the session QoS parameter of the MBMS session, where configuration parameters of RBs established for different RNs may be the same or may be different, and triggers a different destination RN respectively according to the configuration parameter of the RB to establish the corresponding RB in the subsequent steps S205 and S206.

Step S203: The DeNB sends respectively to the first destination RN and the second destination RN an MBMS Session Start Request message including the configuration information parameters of the MBMS session, which are the Session ID of the MBMS session, the user plane data tunnel identifier of the MBMS session (e.g., the Tunnel Endpoint Identifier (TEID)) and the MBMS Service Area information. The first RN and the second RN store the configuration information of the MBMS session respectively.

Step S204: The first RN and the second RN send an MBMS Session Start Response message respectively to the DeNB after the MBMS session is established at the control plane.

Step S205: The DeNB triggers a process of establishing a Un interface RB for the second RN according to the configuration parameter of the RB determined in the step S202 upon reception of the MBMS Session Start Response message sent from the second RN, where the established RN can be referred to as a second RB for distinguishing.

Step S206: The DeNB triggers a process of establishing a Un interface RB for the first RN according to the configuration parameter of the RB determined in the step S202 upon reception of the MBMS Session Start Response message sent from the first RN, where the established RN can be referred to as a first RB for distinguishing.

Particularly, reference can be made to the prior art for the DeNB to trigger a process of establishing a Un interface RB in the steps S205 and S206, and a repeated description thereof will be omitted here.

Step S207: The DeNB sends an MBMS Session Start Response message to the MCE after the MBMS session is established.

Step S208: The MCE sends an MBMS Session Start Response message to the core network after the MBMS session is established.

Step S209: The core network user plane device MBMS GW starts transmission of the user plane data corresponding to the MBMS session to the DeNB. The DeNB forwards the user plane data corresponding to the MBMS session, received from the MBMS GW, to the first destination RN and the second destination RN respectively through the first RB and the second RB.

Second Embodiment

The DeNB maps an MBMS bearer onto an established Un RB as per a QoS attribute of the MBMS bearer for a different destination RN.

In the embodiment of the invention, different MBMS bearers with a similar QoS requirement can be mapped onto a Un RB, but also an MBMS bearer and an EPS bearer with a similar QoS requirement can be mapped onto a Un RB.

Figure 3:
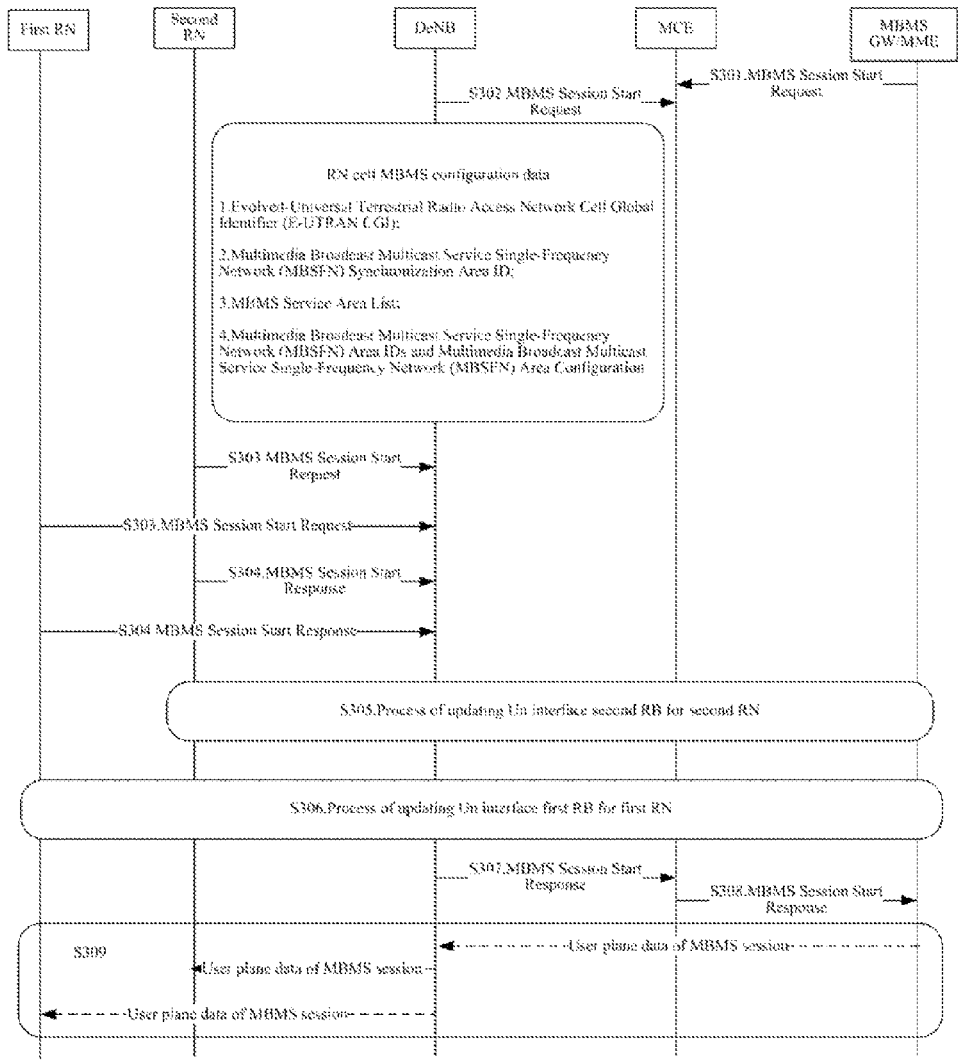
FIG. 3 is a schematic diagram of a process of establishing an MBMS bearer (mapping to a corresponding RB as per a QoS attribute respectively for a different RN) according to an embodiment of the invention.

As illustrated in FIG. 3, a process of establishing an MBMS bearer mapped to a corresponding RB as per a QoS attribute respectively for a different RN particularly includes the following steps.

Step S301: A core network device (including a user plane node MBMS GW and a control plane node MME) triggers an MCE in an MBMS Session Start Request message to establish an MBMS bearer for an MBMS session, where the MBMS Session Start Request message includes Session ID, Session QoS Parameter, Session Duration, MBMS Service Area information, etc.

Step S302: The MCE triggers a DeNB in an MBMS Session Start Request message to establish an MBMS bearer for the MBMS session, where the MBMS Session Start Request message includes Session ID, Session QoS Parameter, Session Duration, MBMS Service Area information, and a GPRS Tunnel Protocol (GTP) Tunnel Endpoint Identifier (TEID) for the MBMS session, etc.

Particularly, the GTP TEID for the MBMS session is used for an RN to subsequently determine the MBMS session to which user plane data belongs according to a tunnel identifier of the user plane data, i.e., the TEID, in the step S309, that is, to match the MBMS session with the user plane data corresponding to the MBMS session.

In a startup process of the RN, an RN cell reports configuration parameters obtained from an Operation and Management (OAM) scheme, including an RN cell ID, an MBSFN synchronization area ID and an MBMS service area ID, to the DeNB via an M2 interface between the RN and the DeNB. The DeNB stores these parameters locally, and the DeNB functions as a proxy of the RN to send the information of the RN cell to the MCE, the MCE sends configuration information of an MBMS Single-Frequency Network (MBSFN) area related to the RN cell to the DeNB, and the DeNB stores the configuration information of the MBSFN area of the RN Cell locally.

The DeNB determines a list of destination RNs (assumed a first RN and a second RN belong to the list of destination RNs) according to the identifier of an MBMS service area to which the RN cell belongs to and the MBMS service area identifier carried in the MBMS Session Start Request message.

Particularly, in the embodiment of the invention, each RN can manage a plurality of RN cells concurrently, and each DeNB can serve a plurality of RNs. The DeNB stores therein correspondence relationships between lists of RN cells and RNs, so the DeNB firstly determines a list of RN cells involved in the MBMS session and then determines the list of destination RNs according to the correspondence relationships between lists of RN cells and RNs and forwards corresponding signalling to RNs in the list of destination RNs.

On the other hand, the DeNB determines whether an RB with the same or similar QoS attribute has been established for the destination RNs via Un, using a preset mapping table of session QoS parameters of MBMS sessions to RBs according to the session QoS parameter of the MBMS session. If so, then the DeNB triggers the different destination RNs respectively to perform a process of updating the RB to allocate an extra resource for the RB in the subsequent steps S305 and S306; otherwise, the DeNB subsequently proceeds as in the flow of the step S203 to the step S209 in the first embodiment.

Step S303: The DeNB sends respectively to the first destination RN and the second destination RN an MBMS Session Start Request message including the parameters which are the Session ID and the MBMS Service Area information. The first RN and the second RN store the configuration information of the MBMS session respectively.

Step S304: The first RN and the second RN send an MBMS Session Start Response message respectively to the DeNB after the MBMS session is established.

Step S305: The DeNB triggers a process of updating the Un interface second RB for the second RN to update a bandwidth of the second RB according to the configuration parameter of the RB determined in the step S302 upon reception of the MBMS Session Start Response message sent from the second RN, where the RB updated for the second RN can be referred to as a second RB for distinguishing.

Step S306: The DeNB triggers a process of updating the Un interface first RB for the first RN to update a bandwidth of the first RB according to the configuration parameter of the RB determined in the step S302 upon reception of the MBMS Session Start Response message sent from the first RN, where the RB updated for the first RN can be referred to as a first RB for distinguishing.

Particularly, reference can be made to the prior art for the DeNB to trigger a process of updating the Un interface RB in the steps 305 and S306, and a repeated description thereof will be omitted here.

Step S307: The DeNB sends an MBMS Session Start Response message to the MCE after the MBMS session is established.

Step S308: The MCE sends an MBMS Session Start Response message to the core network after the MBMS session is established.

Step S309: The core network user plane device MBMS GW starts transmission of the user plane data corresponding to the MBMS session to the DeNB. The DeNB forwards the user plane data corresponding to the MBMS session, received from the MBMS GW, to the first destination RN and the second destination RN respectively through the first RB and the second RB.

Third Embodiment

For each MBMS bearer, the DeNB establishes the same MRB via a Un interface for all of destination RNs.

In a scenario in which the DeNB serves a large number of RNs required to support an MBMS, the use of a multicast bearer MRB can save the use amount of radio resource of a Un interface significantly as compared with establishment of a separate unicast bearer RB for each RN.

Figure 4:
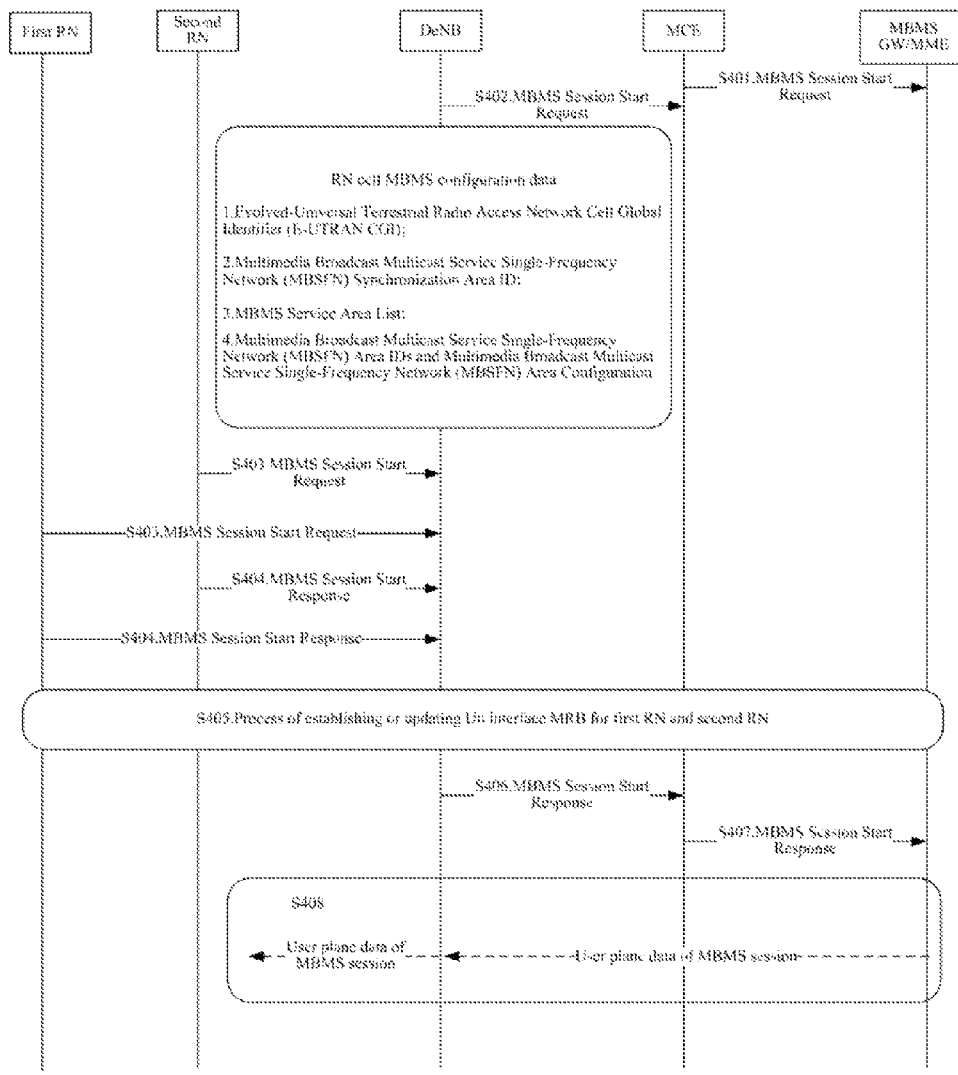
FIG. 4 is a schematic diagram of a process of establishing an MBMS bearer (establishing an MRB for all RNs) according to an embodiment of the invention.

As illustrated in FIG. 4, a particular process of the DeNB to establish for each MBMS bearer the same MRB via a Un interface for all of destination RNs includes the following steps.

Step S401: A core network device (including a user plane node MBMS GW and a control plane node MME) triggers an MCE in an MBMS Session Start Request message to establish an MBMS bearer for an MBMS session, where the MBMS Session Start Request message includes Session ID, Session QoS Parameter, Session Duration, MBMS Service Area information, etc.

Step S402: The MCE triggers a DeNB in an MBMS Session Start Request message to establish an MBMS bearer for the MBMS session, where the MBMS Session Start Request message includes Session ID, Session QoS Parameter, Session Duration, MBMS Service Area information, and a GPRS Tunnel Protocol (GTP) Tunnel Endpoint Identifier (TEID) for the MBMS session, etc.

Particularly, the GTP TEID for the MBMS session is used for an RN to subsequently determine the MBMS session to which user plane data belongs according to a tunnel identifier of the user plane data, i.e., the TEID, in the step S408, that is, to match the MBMS session with the user plane data corresponding to the MBMS session.

In a startup process of the RN, an RN cell reports configuration parameters obtained from an Operation and Management (OAM) scheme, including an RN cell ID, an MBSFN synchronization area ID and an MBMS service area ID, to the DeNB via an M2 interface between the RN and the DeNB. The DeNB stores these parameters locally, and the DeNB functions as a proxy of the RN to send the information of the RN cell to the MCE, the MCE sends configuration information of an MBMS Single-Frequency Network (MBSFN) area related to the RN cell to the DeNB, and the DeNB stores the configuration information of the MBSFN area of the RN Cell locally.

The DeNB determines a list of destination RNs (assumed a first RN and a second RN belong to the list of destination RNs) according to the identifier of an MBMS service area to which the RN cell belongs to and the MBMS service area identifier carried in the MBMS Session Start Request message.

Particularly, in the embodiment of the invention, each RN can manage a plurality of RN cells concurrently, and each DeNB can serve a plurality of RNs. The DeNB stores therein correspondence relationships between lists of RN cells and RNs, so the DeNB firstly determines a list of RN cells involved in the MBMS session and then determines the list of destination RNs according to the correspondence relationships between lists of RN cells and RNs and forwards corresponding signalling to RNs in the list of destination RNs.

On the other hand, the DeNB determines a configuration parameter of an MRB subsequently triggered to be established via a Un interface, that is, information of a resource allocated to the MBMS session at the physical layer, using a preset mapping table of session QoS parameters of MBMS sessions to configuration parameters of MRBs according to the session QoS parameter of the MBMS session.

Step S403: The DeNB sends respectively to the first destination RN and the second destination RN an MBMS Session Start Request message including the parameters which are the Session ID and the MBMS Service Area information. The first RN and the second RN store the configuration information of the MBMS session respectively.

Step S404: The first RN and the second RN send an MBMS Session Start Response message respectively to the DeNB after the MBMS session is established.

Figure 5:
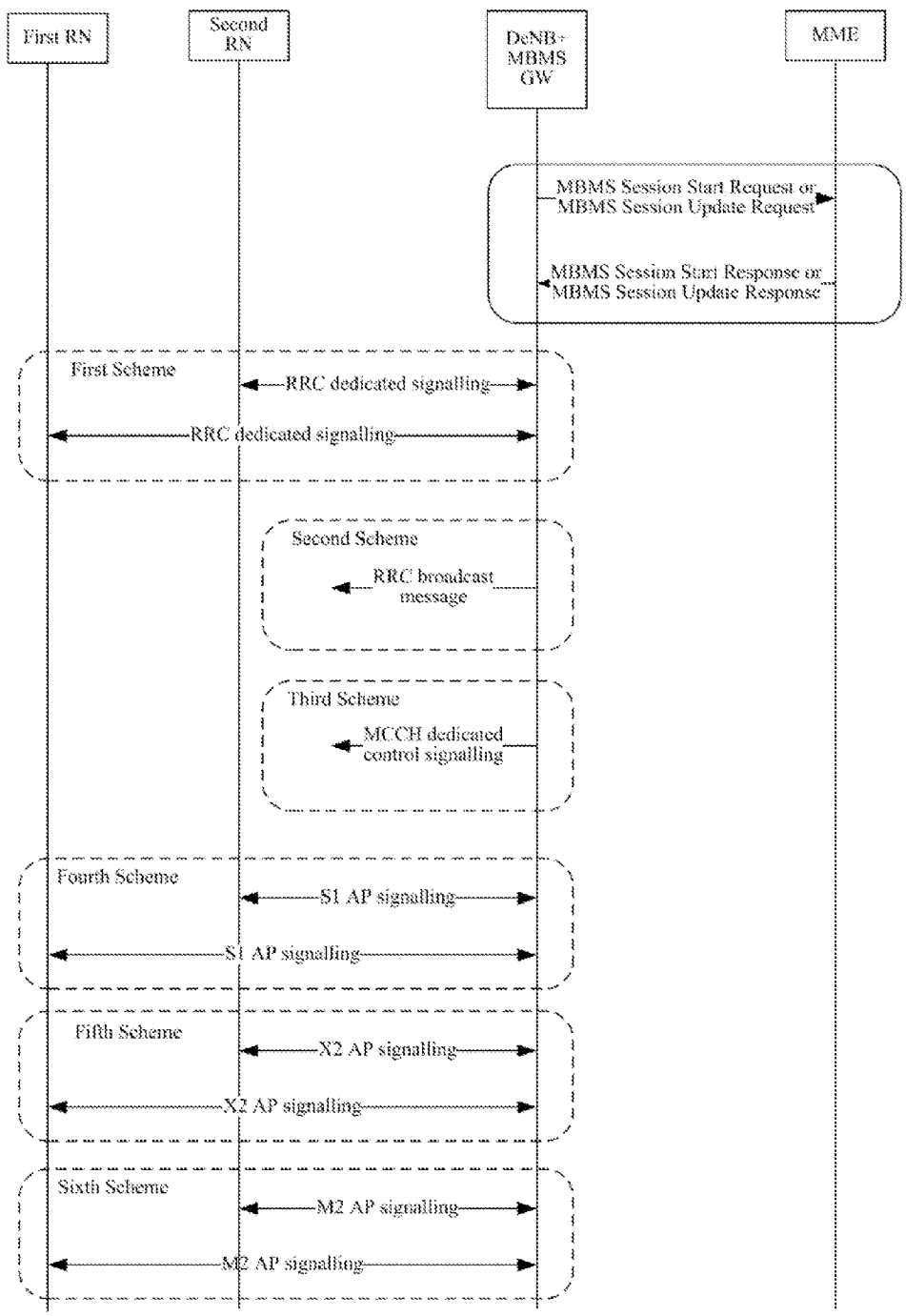
FIG. 5 is a schematic diagram of triggering a process of establishing an MRB or a process of updating an MRB with a DeNB as an MBMS GW proxy according to an embodiment of the invention.

Step 405: The DeNB triggers an MRB establishment process according to the configuration parameter of the MRB determined in the step S402 upon reception of the MBMS Session Start Response message sent from the second RN, as illustrated in FIG. 5.

On one hand, the DeNB functions as the MBMS GW to trigger the MME to establish an MBMS session context corresponding to the MRB at the core network side.

On the other hand, the DeNB configures the RN (including the first RN and the second RN) by signalling thereto information on a physical resource of the Un interface for the MRB, including the identifier of the MRB, a Tunnel Endpoint Identifier (TEID), an MBSFN sub-frame configuration, a modulation and coding scheme, a logical channel identifier for the MRB and identifier information of the MBMS session associated with the MRB, and since there are a number of interfaces in different protocols between the RN (including the first RN and the second RN) and the DeNB, the DeNB can send a correspondence relationship between the MRB and the user plane data tunnel identifier (e.g., the TEID) of the MBMS session and a correspondence relationship between the MRB and the MBMS session to the RN (including the first RN and the second RN) in the following schemes:

In a first scheme, they are sent in RRC dedicated signalling;

In a second scheme, they are sent in an RRC broadcast message;

In a third scheme, they are sent in Multicast Control Channel (MCCH) dedicated control signalling;

In a fourth scheme, they are sent in an S1 Application Layer protocol (AP) signalling for an S1 interface between the DeNB and the RN;

In a fifth scheme, they are sent in an X2 AP signalling for an X2 interface between the DeNB and the RN; and In a sixth scheme, they are sent in an M2 AP signalling for an M2 interface between the DeNB and the RN.

Step S406: The DeNB sends an MBMS Session Start Response message to the MCE after the MBMS session is established.

Step S407: The MCE sends an MBMS Session Start Response message to the core network after the MBMS session is established.

Step S408: The core network user plane device MBMS GW starts transmission of the user plane data corresponding to the MBMS session to the DeNB. The DeNB transmits the user plane data of the MBMS session, received from the MBMS GW, to the first RN and the second RN over the multicast bearer MRB via the Un interface.

Fourth Embodiment

The DeNB maps an MBMS bearer onto an established MRB as per QoS attribute via a Un interface for all of destination RNs as per a QoS attribute of the MBMS bearer.

It shall be noted that different MBMS bearers with a similar QoS requirement can be mapped onto a Un MRB; and in a scenario in which the DeNB serves a large number of RNs required to support an MBMS, the use of a multicast bearer MRB can save the use amount of radio resource of a Un interface significantly as compared with establishment of a separate unicast bearer RB for each RN.

As illustrated in FIG. 4, the DeNB maps an MBMS bearer onto an established MRB as per QoS attribute via a Un interface for all of destination RNs as per a QoS attribute of the MBMS bearer particularly as follows.

Step S401: A core network device (including a user plane node MBMS GW and a control plane node MME) triggers an MCE in an MBMS Session Start Request message to establish an MBMS bearer for an MBMS session, where the MBMS Session Start Request message includes Session ID, Session QoS Parameter, Session Duration, MBMS Service Area information, etc.

Step S402: The MCE triggers a DeNB in an MBMS Session Start Request message to establish an MBMS bearer for the MBMS session, where the MBMS Session Start Request message includes Session ID, Session QoS Parameter, Session Duration, MBMS Service Area information, and a GPRS Tunnel Protocol (GTP) Tunnel Endpoint Identifier (TEID) for the MBMS session, etc.

Particularly, the GTP TEID for the MBMS session is used for an RN to subsequently determine the MBMS session to which user plane data belongs according to a tunnel identifier of the user plane data, i.e., the TEID, in the step S408, that is, to match the MBMS session with the user plane data corresponding to the MBMS session.

In a startup process of the RN, an RN cell reports configuration parameters obtained from an Operation and Management (OAM) scheme, including an RN cell ID, an MBSFN synchronization area ID and an MBMS service area ID, to the DeNB via an M2 interface between the RN and the DeNB. The DeNB stores these parameters locally, and the DeNB functions as a proxy of the RN to send the information of the RN cell to the MCE, the MCE sends configuration information of an MBMS Single-Frequency Network (MBSFN) area related to the RN cell to the DeNB, and the DeNB stores the configuration information of the MBSFN area of the RN Cell locally.

The DeNB determines a list of destination RNs (assumed a first RN and a second RN belong to the list of destination RNs) according to the identifier of an MBMS service area to which the RN cell belongs to and the MBMS service area identifier carried in the MBMS Session Start Request message.

On the other hand, the DeNB determines a configuration parameter of an MRB to be updated and subsequently triggered to be established via a Un interface, using a preset mapping table of session QoS parameters of MBMS sessions to configuration parameters of MRBs according to the session QoS parameter of the MBMS session.

Step S403: The DeNB sends respectively to the first destination RN and the second destination RN an MBMS Session Start Request message including the parameters which are the Session ID and the MBMS Service Area information. The first RN and the second RN store the configuration information of the MBMS session respectively.

Step S404: The first RN and the second RN send an MBMS Session Start Response message respectively to the DeNB after the MBMS session is established.

Step 405: The DeNB triggers an MRB update process according to the configuration parameter of the MRB determined in the step S402 upon reception of the MBMS Session Start Response message sent from the second RN, as illustrated in FIG. 5.

On one hand, the DeNB triggers the MME through an MBMS GW proxy function to perform a process of updating an MBMS session context corresponding to the MRB (e.g., updating the QoS parameter) at the core network side.

On the other hand, the DeNB configures the RN (including the first RN and the second RN) by signalling thereto information on an updated physical resource of the Un interface for the MRB, including the identifier of the MRB itself, an MBSFN sub-frame configuration, a modulation and coding scheme, a logical channel identifier for the MRB and identifier information of the MBMS session associated with the MRB, and since there are a number of interfaces in different protocols between the RN (including the first RN and the second RN) and the DeNB, the DeNB can send a correspondence relationship between the MRB and the user plane data tunnel identifier (e.g., the TEID) of the MBMS session and a correspondence relationship between the MRB and the MBMS session to the RN (including the first RN and the second RN) in the following schemes:

In a first scheme, they are sent in RRC dedicated signalling;

In a second scheme, they are sent in an RRC broadcast message;

In a third scheme, they are sent in Multicast Control Channel (MCCH) dedicated control signalling;

In a fourth scheme, they are sent in an S1 AP signalling for an S1 interface;

In a fifth scheme, they are sent in an X2 AP signalling for an X2 interface; and In a sixth scheme, they are sent in an M2 AP signalling for an M2 interface.

Step S406: The DeNB sends an MBMS Session Start Response message to the MCE after the MBMS session is established.

Step S407: The MCE sends an MBMS Session Start Response message to the core network after the MBMS session is established.

Step S408: The core network user plane device MBMS GW starts transmission of the user plane data corresponding to the MBMS session to the DeNB. The DeNB transmits the user plane data of the MBMS session, received from the MBMS GW, to the first RN and the second RN over the multicast bearer MRB via the Un interface.

Both the configuration parameter of the RB and the configuration parameter of the MRB described in the foregoing embodiments have been defined in the existing protocol 3GPP TS36.331, and a repeated description thereof will be omitted here.

Fifth Embodiment

For First and Second Embodiments

Figure 6:
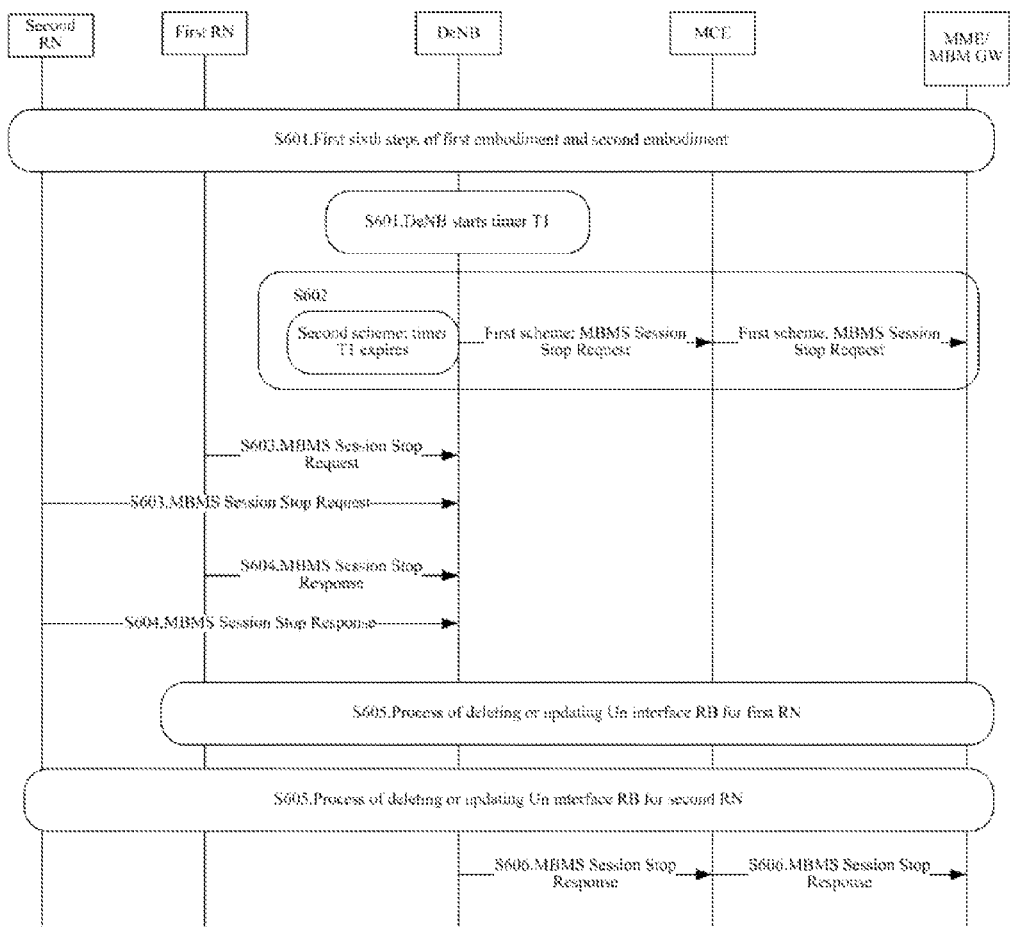
FIG. 6 is a schematic diagram of a process of releasing a Un interface RB according to an embodiment of the invention.

As illustrated in FIG. 6, a process of releasing an RB resource of a Un interface includes the following steps.

Step 601: Referring to the first six steps in the first and second embodiments, the DeNB sets a counting duration of a timer T1 according to the session duration attribute in the MBMS session after the DeNB establishes the Un interface RBs respectively for the first RN and the second RN successfully and starts the timer T1 when transmitting the user plane data of the MBMS session to the RNs.

Step 602: The DeNB determines whether the MBMS session is terminated in the following two schemes.

In a first scheme, the DeNB receives an MBMS Session Stop Request message from the MCE, where the MCE receives the MBMS Session Stop Request message from the MME.

In a second scheme, the timer T1 expires.

Step 603: The DeNB triggers the first RN and the second RN respectively in an MBMS Session Stop Request message to delete the corresponding MBMS session context.

Step 604: The DeNB determines that the first RN and the second RN have deleted the MBMS session context upon reception of an MBMS Session Stop Response message.

Step 605: The DeNB triggers a process of releasing the RB resource of the Un interface corresponding to the MBMS session for the first RN and a process of releasing the RB resource of the Un interface corresponding to the MBMS session for the second RN.

Step 606: The DeNB notifies the MCE and the core network device MME of termination of the MBMS session in an MBMS Session Stop Response message after the DeNB determines that the RB resources occupied for the MBMS session have been released.

Sixth Embodiment

For Third and Fourth Embodiments

Figure 7:
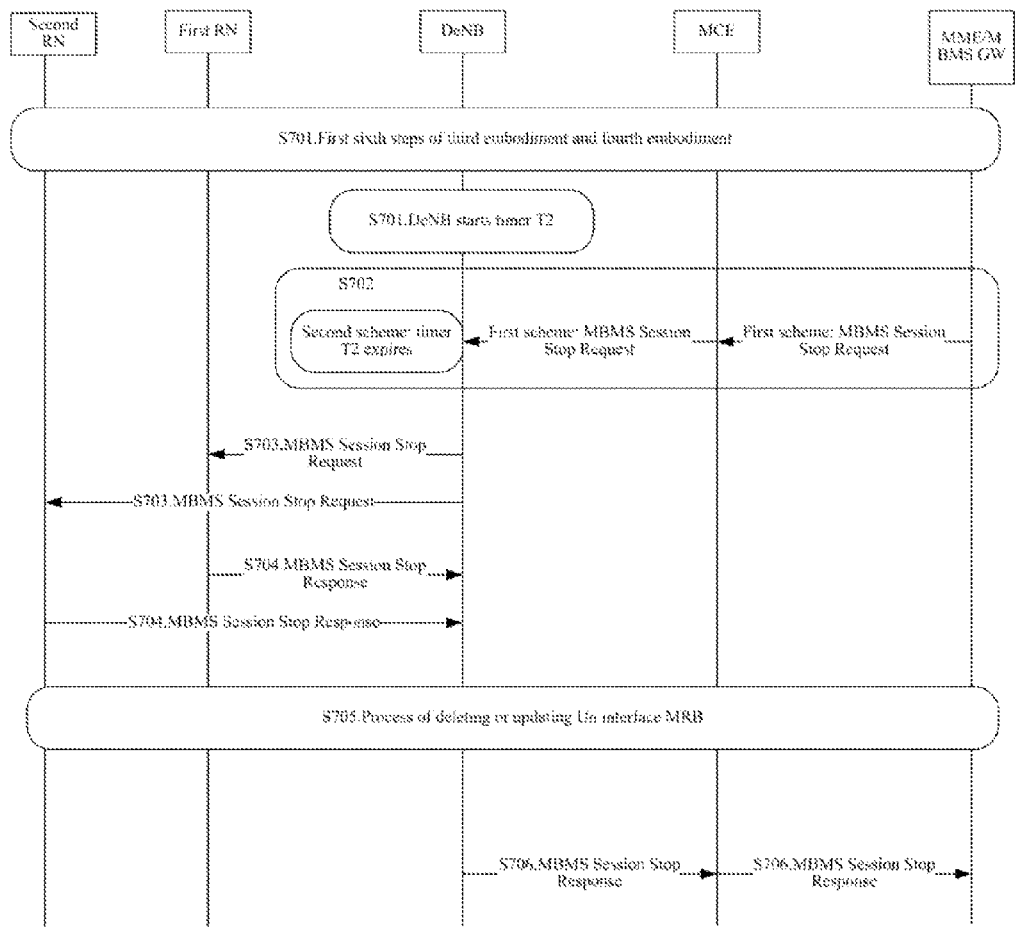
FIG. 7 is a schematic diagram of a process of releasing a Un interface MRB according to an embodiment of the invention.

As illustrated in FIG. 7, a process of releasing an MRB resource of a Un interface includes the following steps.

Step 701: Referring to the first six steps in the third and fourth embodiments, the DeNB sets a counting duration of a timer T2 according to the session duration attribute in the MBMS session after the DeNB establishes the Un interface MRBs respectively for the first RN and the second RN successfully and starts the timer T2 when transmitting the user plane data of the MBMS session to the RNs.

Step 702: The DeNB determines whether the MBMS session is terminated in the following two schemes.

In a first scheme, the DeNB receives an MBMS Session Stop Request message from the MCE, where the MCE receives the MBMS Session Stop Request message from the MME.

In a second scheme, the timer T2 expires.

Step 703: The DeNB triggers the first RN and the second RN respectively in an MBMS Session Stop Request message to delete the corresponding MBMS session context.

Step 704: The DeNB determines that the first RN and the second RN have deleted the MBMS session context upon reception of an MBMS Session Stop Response message.

Step 705: The DeNB triggers a process of releasing the MRB resource corresponding to the MBMS session for the Un interface and notifies the core network device of the foregoing message.

Step 706: The DeNB notifies the MCE and the core network device MME of termination of the MBMS session in an MBMS Session Stop Response message after the DeNB determines that the MRB resource occupied for the MBMS session has been released.

It shall be noted that the foregoing embodiments of the invention have been described by taking two RNs as an example, but the technical solution according to the embodiments of the invention can be applicable to a larger number of RNs.

Apparatuses according to embodiments of the invention will be described respectively below.

Figure 8:
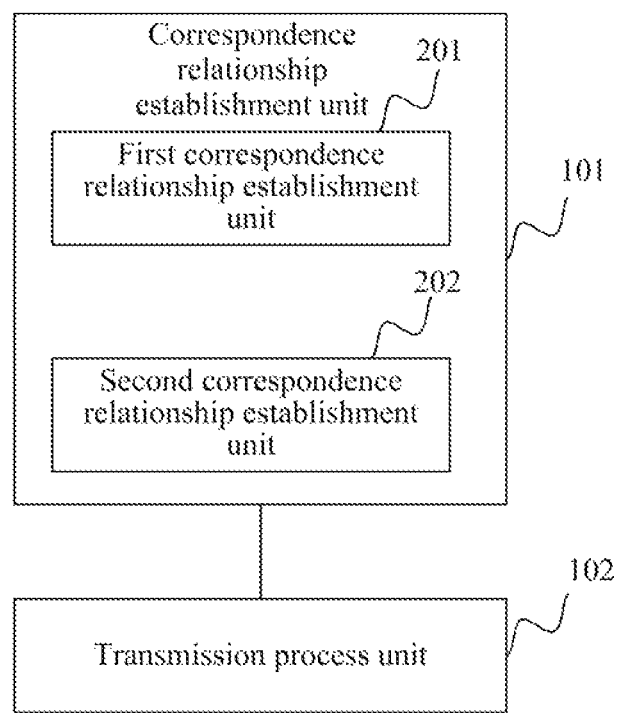
FIG. 8 is a schematic structural diagram of a data transmission apparatus according to an embodiment of the invention.

Referring to FIG. 8, an embodiment of the invention provides a data transmission apparatus at the RN side, where this apparatus includes:

a correspondence relationship establishment unit 101 configured to establish a first correspondence relationship between a Multimedia Broadcast Multicast Service (MBMS) bearer identifier and a user plane data tunnel identifier of an MBMS session and a second correspondence relationship between the user plane data tunnel identifier of the MBMS session and an MBMS session identifier; and a transmission process unit 102 configured to obtain user plane data of the MBMS session transmitted from a Donor eNB (DeNB) according to the first correspondence relationship and to transmit the user plane data of the MBMS session to a User Equipment (UE) according to the second correspondence relationship.

Preferably, the correspondence relationship establishment unit 101 includes:

a first correspondence relationship establishment unit 201 configured to receive an MBMS Session Start Request message sent from the DeNB and to obtain therefrom the user plane data tunnel identifier of the MBMS session; and in a process of establishing or updating an MBMS bearer of a Un interface triggered by the DeNB, to obtain the MBMS bearer identifier and to establish the first correspondence relationship between the MBMS bearer identifier and the user plane data tunnel identifier of the MBMS session; and a second correspondence relationship establishment unit 202 configured to receive an MBMS Session Start Request message sent from the DeNB and to obtain therefrom the user plane data tunnel identifier of the MBMS session and the MBMS session identifier; and to establish the second correspondence relationship between the user plane data tunnel identifier of the MBMS session and the MBMS session identifier.

Figure 9:
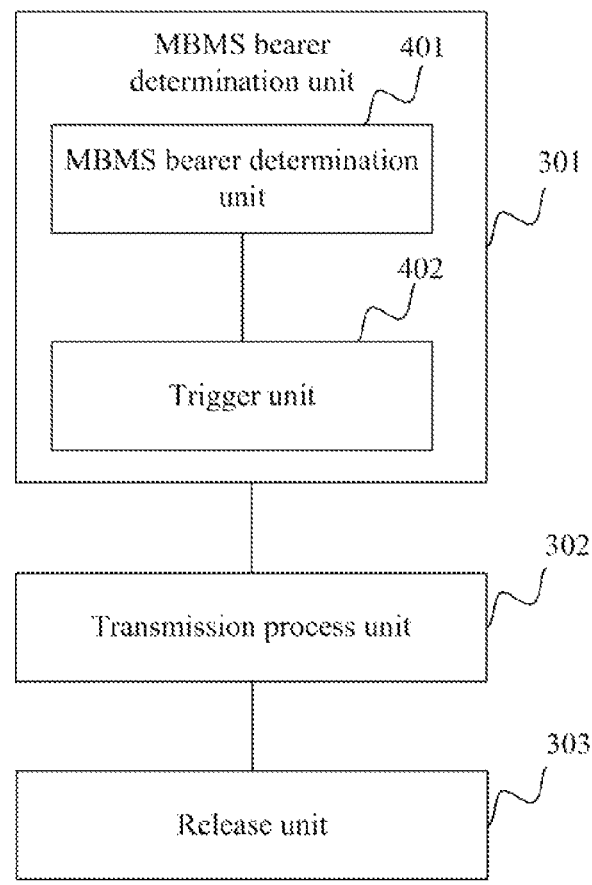
FIG. 9 is a schematic structural diagram of a data transmission apparatus according to an embodiment of the invention.
Figure 10:
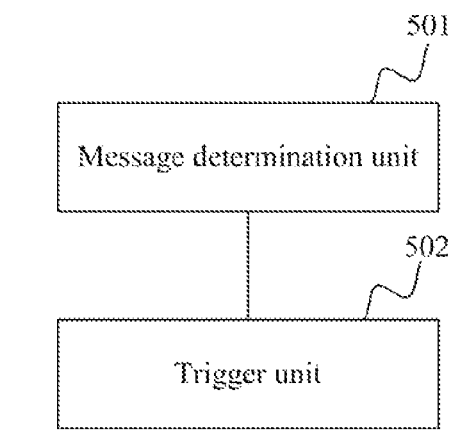
FIG. 10 is a schematic structural diagram of a data transmission apparatus according to an embodiment of the invention.

Referring to FIG. 9, an embodiment of the invention provides a data transmission apparatus at the DeNB side, where this apparatus includes:

an MBMS bearer determination unit 301 configured to determine a Multimedia Broadcast Multicast Service (MBMS) bearer of a Un interface; and a transmission process unit 302 configured to obtain user plane data of an MBMS session transmitted from a user plane device of a core network after the MBMS session is established; and to transmit the user plane data of the MBMS session to a Relay Node (RN) over the MBMS bearer.

Preferably, the MBMS bearer determination unit 301 includes:

a configuration parameter determination unit 401 configured to determine configuration parameter information of the MBMS bearer of the Un interface according to a Quality of Service (QoS) parameter of the MBMS session carried in an MBMS Session Start Request message sent from a Multi-Cell/Multicast Coordination Entity (MCE); and a trigger unit 402 configured to send the MBMS Session Start Request message to the RN and to trigger a process of establishing or updating the MBMS bearer of the Un interface according to the configuration parameter information of the MBMS bearer of the Un interface upon reception of an MBMS Session Start Response message fed back from the RN.

Preferably, the MBMS bearer is a Radio Bearer (RB) or an MBMS point to multipoint Radio Bearer (MRB);

when the MBMS bearer is an MRB, the configuration parameter information of the MBMS bearer of the Un interface determined by the configuration parameter determination unit 401 includes: the identifier of the MRB, a Tunnel Endpoint Identifier (TEID), a multimedia broadcast multicast service single-frequency network sub-frame configuration, a modulation and coding scheme, a logical channel identifier for the MRB, and the MBMS session identifier associated with the MRB.

Preferably, the trigger unit 402 sends the configuration parameter information of the MBMS bearer of the Un interface to the RN in one of the following schemes:

In a first scheme, it is sent in Radio Resource Control (RRC) dedicated signalling;

In a second scheme, it is sent in a Radio Resource Control (RRC) broadcast message;

In a third scheme, it is sent in Multicast Control Channel (MCCH) dedicated control signalling;

In a fourth scheme, it is sent in an application layer protocol signalling for an S1 interface between the DeNB and the RN;

In a fifth scheme, it is sent in an application layer protocol signalling for an X2 interface between the DeNB and the RN; and In a sixth scheme, it is sent in an application layer protocol signalling for an M2 interface between the DeNB and the RN.

Preferably, the trigger unit 402 functions as an MBMS Gateway (MBMS GW) to trigger a Mobility Management Entity (MME) to establish an MBMS session context corresponding to the MRB at the core network side.

Preferably, the apparatus further includes:

a release unit 303 configured to release an MBMS bearer resource upon determining termination of the MBMS session.

Preferably, the release unit 303 determines termination of the MBMS session when a timer expires or upon reception of an MBMS Session Stop Request message sent from the MCE;

where the timer is started when the DeNB transmits the user plane data of the MBMS session to the RN; and the timer has a counting duration determined according to a Session Duration attribute in the MBMS session.

Correspondingly an embodiment of the invention provides a data transmission apparatus at the MCE side, where this apparatus includes:

a message determination unit 501 configured to determine a Multimedia Broadcast Multicast Service (MBMS) Session Start Request message; and a trigger unit 502 configured to trigger a Donor eNB (DeNB) in the MBMS Session Start Request message to establish an MBMS bearer for an MBMS session;

where the MBMS Session Start Request message includes a Quality of Service (QoS) parameter of the MBMS session.

An embodiment of the invention provides a data transmission system including:

a Multi-Cell/Multicast Coordination Entity (MCE) configured to trigger a Donor eNB (DeNB) in a Multimedia Broadcast Multicast Service (MBMS) Session Start Request message to establish an MBMS bearer for an MBMS session; and the DeNB configured to determine a Multimedia Broadcast Multicast Service (MBMS) bearer of a Un interface in response to the trigger of the MCE; and to obtain and forward over the MBMS bearer to a Relay Node (RN) user plane data of the MBMS session transmitted from a user plane device of a core network after the MBMS session is established.

The RN configured to establish a first correspondence relationship between an MBMS bearer identifier and a user plane data tunnel identifier of the MBMS session and a second correspondence relationship between the user plane data tunnel identifier of the MBMS session and an MBMS session identifier; to obtain the user plane data of the MBMS session transmitted from the DeNB according to the first correspondence relationship; and to transmit the user plane data of the MBMS session to a User Equipment (UE) according to the second correspondence relationship.

In summary, in the embodiments of the invention, an MCE sends a QoS parameter of an MBMS bearer to a DeNB, and the DeNB determines from the QoS parameter a configuration parameter of an RB or an MRB subsequently triggered to be established via a Un interface. The DeNB sends the configuration information of the MRB to an RN, including but not limited to the identifier of the MRB, a Tunnel Endpoint Identifier (TEID), an MBSFN sub-frame configuration, a modulation and coding scheme, a logical channel identifier for the MRB, and an MBMS session identifier associated with the MRB. The DeNB signals the configuration information of the MRB to the RN, and the DeNB triggers a process of establishing/updating an MBMS session context corresponding to the MRB in an MME (the DeNB sends QoS information of the MRB to the MME). The DeNB triggers the RB to be released upon expiration of T1, upon reception of a Session Stop Request or due to other factors. The DeNB triggers the MRB to be released upon expiration of T2, upon reception of a Session Stop Request or due to other factors. The DeNB sets a counting duration of the timer T1/T2 according to a Session Duration in an MBMS Session Start Request. The RN receives user plane data of the MBMS session via the Un interface according to a binding relationship received from the DeNB between the RB/MRB and a user plane data tunnel identifier of the MBMS session. The RN establishes a binding relationship between the user plane data of the MBMS session and the MBMS session ID and transmits the user plane data of the MBMS session over a physical resource of the Uu interface serving the MBMS session. Thus the technical solution according to the embodiments of the invention can enable an operator to support an MBMS seamlessly throughout the network while saving an investment cost of the operator.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A data transmission method, comprising:
    establishing, by a Relay Node, RN, a first correspondence relationship between a Multimedia Broadcast Multicast Service, MBMS, bearer identifier and a user plane data tunnel identifier of an MBMS session and a second correspondence relationship between the user plane data tunnel identifier of the MBMS session and an MBMS session identifier; and
    obtaining, by the RN, user plane data of the MBMS session transmitted from a Donor eNB, DeNB, according to the first correspondence relationship and transmitting the user plane data of the MBMS session to a User Equipment, UE, according to the second correspondence relationship;
    wherein the RN establishes the first correspondence relationship comprises:
    receiving, by the RN, an MBMS Session Start Request message sent from the DeNB and obtain therefrom the user plane data tunnel identifier of the MBMS session; and
    in a process of establishing or updating an MBMS bearer of a Un interface triggered by the DeNB, obtaining, by the RN, the MBMS bearer identifier and establishing the first correspondence relationship between the MBMS bearer identifier and the user plane data tunnel identifier of the MBMS session.

2. The method according to claim 1, wherein the RN establishes the second correspondence relationship comprises:
    receiving, by the RN, an MBMS Session Start Request message sent from the DeNB and obtaining therefrom the user plane data tunnel identifier of the MBMS session and the MBMS session identifier; and
    establishing, by the RN, the second correspondence relationship between the user plane data tunnel identifier of the MBMS session and the MBMS session identifier.

3. A data transmission method, comprising:
    determining, by a Donor eNB, DeNB, a Multimedia Broadcast Multicast Service, MBMS, bearer of a Un interface;
    obtaining, by the DeNB, user plane data of an MBMS session transmitted from a user plane device of a core network after the MBMS session is established; and
    transmitting, by the DeNB, the user plane data of the MBMS session to a Relay Node, RN, over the MBMS bearer;
    wherein the DeNB determines an MBMS bearer of a Un interface comprises:
    determining, by the DeNB, configuration parameter information of the MBMS bearer of the Un interface according to a Quality of Service, QoS, parameter of the MBMS session carried in an MBMS Session Start Request message sent from a Multi-Cell/Multicast Coordination Entity, MCE; and
    sending, by the DeNB, the MBMS Session Start Request message to the RN and triggering a process of establishing or updating the MBMS bearer of the Un interface according to the configuration parameter information of the MBMS bearer of the Un interface upon reception of an MBMS Session Start Response message fed back from the RN;
wherein the DeNB triggers a process of establishing or updating the MBMS bearer of the Un interface according to the configuration parameter information of the MBMS bearer of the Un interface comprises:
sending, by the DeNB, the configuration parameter information of the MBMS bearer of the Un interface to the RN in one of the following schemes:
in a first scheme, it is sent in Radio Resource Control, RRC, dedicated signaling;
in a second scheme, it is sent in a Radio Resource Control, RRC, broadcast message;
in a third scheme, it is sent in Multicast Control Channel, MCCH, dedicated control signaling; and
in a sixth scheme, it is sent in an application layer protocol signaling for an M2 interface between the DeNB and the RN.

4. The method according to claim 3, wherein the MBMS bearer is a Radio Bearer, RB, or an MBMS point to multipoint Radio Bearer, MRB.

5. The method according to claim 4, wherein when the MBMS bearer is an MRB, the configuration parameter information of the MBMS bearer of the Un interface comprises:
an identifier of the MRB, a Tunnel Endpoint Identifier, TEID, a multimedia broadcast multicast service single-frequency network sub-frame configuration, a modulation and coding scheme, a logical channel identifier for the MRB, and the MBMS session identifier associated with the MRB.

6. The method according to claim 3, wherein the DeNB triggers a process of establishing or updating the MBMS bearer of the Un interface according to the configuration parameter information of the MBMS bearer of the Un interface further comprises:
the DeNB functioning as an MBMS Gateway, MBMS GW, to trigger a Mobility Management Entity, MME, to establish an MBMS session context corresponding to the MRB at the core network side.

7. The method according to claim 6, wherein the method further comprises:
releasing, by the DeNB, an MBMS bearer resource upon determining termination of the MBMS session.

8. The method according to claim 7, wherein the DeNB determines termination of the MBMS session comprises:
determining, by the DeNB, termination of the MBMS session when a timer expires or upon reception of an MBMS Session Stop Request message sent from an MCE, and
wherein the timer is started when the DeNB transmits the user plane data of the MBMS session to the RN; and the timer has a counting duration determined according to a Session Duration attribute in the MBMS session.

9. A non-transitory storage device having program code for transmitting data stored thereon, wherein the program code is executable to implement:
a correspondence relationship establishment unit configured to establish a first correspondence relationship between a Multimedia Broadcast Multicast Service, MBMS, bearer identifier and a user plane data tunnel identifier of an MBMS session and a second correspondence relationship between the user plane data tunnel identifier of the MBMS session and an MBMS session identifier; and
a transmission process unit configured to obtain user plane data of the MBMS session transmitted from a Donor eNB, DeNB, according to the first correspondence relationship and to transmit the user plane data of the MBMS session to a User Equipment, UE, according to the second correspondence relationship;
wherein the correspondence relationship establishment unit comprises:
a first correspondence relationship establishment unit configured to receive an MBMS Session Start Request message sent from the DeNB and to obtain therefrom the user plane data tunnel identifier of the MBMS session; and in a process of establishing or updating an MBMS bearer of a Un interface triggered by the DeNB, to obtain the MBMS bearer identifier and to establish the first correspondence relationship between the MBMS bearer identifier and the user plane data tunnel identifier of the MBMS session.

10. The non-transitory storage device according to claim 9, wherein the correspondence relationship establishment unit further comprises:
a second correspondence relationship establishment unit configured to receive the MBMS Session Start Request message sent from the DeNB and to obtain therefrom the user plane data tunnel identifier of the MBMS session and the MBMS session identifier; and to establish the second correspondence relationship between the user plane data tunnel identifier of the MBMS session and the MBMS session identifier.

11. A non-transitory storage device having program code for transmitting data stored thereon, wherein the program code is executable to implement:
an MBMS bearer determination unit configured to determine a Multimedia Broadcast Multicast Service, MBMS, bearer of a Un interface; and
a transmission process unit configured to obtain user plane data of an MBMS session transmitted from a user plane device of a core network after the MBMS session is established; and to transmit the user plane data of the MBMS session to a Relay Node, RN, over the MBMS bearer;
wherein the MBMS bearer determination unit comprises:
a configuration parameter determination unit configured to determine configuration parameter information of the MBMS bearer of the Un interface according to a Quality of Service, QoS, parameter of the MBMS session carried in an MBMS Session Start Request message sent from a Multi-Cell/Multicast Coordination Entity, MCE; and
a trigger unit configured to send the MBMS Session Start Request message to the RN and to trigger a process of establishing or updating the MBMS bearer of the Un interface according to the configuration parameter information of the MBMS bearer of the Un interface upon reception of an MBMS Session Start Response message fed back from the RN;
wherein the trigger unit sends the configuration parameter information of the MBMS bearer of the Un interface to the RN in one of the following schemes:
in a first scheme, it is sent in Radio Resource Control, RRC, dedicated signalling;
in a second scheme, it is sent in a Radio Resource Control, RRC, broadcast message;
in a third scheme, it is sent in Multicast Control Channel, MCCH, dedicated control signalling; and
in a sixth scheme, it is sent in an application layer protocol signalling for an M2 interface between the DeNB and the RN.

12. The non-transitory storage device according to claim 11, wherein the MBMS bearer is a Radio Bearer, RB, or an MBMS point to multipoint Radio Bearer, MRB, and when the MBMS bearer is an MRB, the configuration parameter information of the MBMS bearer of the Un interface determined by the configuration parameter determination unit comprises: an identifier of the MRB, a Tunnel Endpoint Identifier, TEID, a multimedia broadcast multicast service single-frequency network subframe configuration, a modulation and coding scheme, a logical channel identifier for the MRB, and the MBMS session identifier associated with the MRB.

13. The non-transitory storage device according to claim 11, wherein the trigger unit functions as an MBMS Gateway, MBMS GW, to trigger a Mobility Management Entity, MME, to establish an MBMS session context corresponding to the MRB at the core network side.

14. The non-transitory storage device according to claim 13, wherein the program code is executable to further implement:

a release unit configured to release an MBMS bearer resource upon determining termination of the MBMS session.

15. The non-transitory storage device according to claim 14, wherein the release unit determines termination of the MBMS session when a timer expires or upon reception of an MBMS Session Stop Request message sent from an MCE; and wherein the timer is started when the DeNB transmits the user plane data of the MBMS session to the RN; and the timer has a counting duration determined according to a Session Duration attribute in the MBMS session.

* * * * *